US010950125B2

United States Patent
Solmaz et al.

(10) Patent No.: US 10,950,125 B2
(45) Date of Patent: Mar. 16, 2021

(54) CALIBRATION FOR WIRELESS LOCALIZATION AND DETECTION OF VULNERABLE ROAD USERS

(71) Applicant: NEC Laboratories Europe GmbH, Heidelberg (DE)

(72) Inventors: Gurkan Solmaz, Heidelberg (DE); Jonathan Fuerst, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 16/382,222

(22) Filed: Apr. 12, 2019

(65) Prior Publication Data
US 2020/0175864 A1 Jun. 4, 2020

Related U.S. Application Data

(60) Provisional application No. 62/774,358, filed on Dec. 3, 2018.

(51) Int. Cl.
| | | |
|---|---|---|
| G08G 1/0967 | (2006.01) | |
| H04B 17/27 | (2015.01) | |
| H04W 64/00 | (2009.01) | |
| H04W 12/00 | (2009.01) | |
| H04B 17/327 | (2015.01) | |

(Continued)

(52) U.S. Cl.
CPC ....... *G08G 1/096783* (2013.01); *B60W 30/09* (2013.01); *G05D 1/028* (2013.01); *G05D 1/0234* (2013.01); *G08G 1/096725* (2013.01); *H04B 17/27* (2015.01); *H04B 17/327* (2015.01); *H04W 12/00524* (2019.01); *H04W 64/006* (2013.01); *B60W 2510/18* (2013.01);
(Continued)

(58) Field of Classification Search
CPC ....... G08G 1/096783; G08G 1/096725; H04B 17/27; H04B 17/327; H04W 12/00524; H04W 12/09; H04W 64/006; G05D 1/0234; G05D 1/028; B60W 30/09; B60W 2510/18; B60W 2510/20; B60W 2550/10; B60W 2550/402
See application file for complete search history.

(56) References Cited

U.S. PATENT DOCUMENTS 6,789,015 B2 *  9/2004  Tsuji ................. G06T 7/20
 701/301
9,517,767 B1 * 12/2016  Kentley ............ G06K 9/00791
(Continued)

OTHER PUBLICATIONS

Quoc Duy Vo, "A Survey of Fingerprint-Based Outdoor Localization", IEEE Communication Surveys & Tutorials, vol. 18, No. 1, Jan. 27, 2016, pp. 491-506.
(Continued)

*Primary Examiner* — Rufus C Point
(74) *Attorney, Agent, or Firm* — Leydig, Voit & Mayer, Ltd.

(57) ABSTRACT

A method for localization of a vulnerable road user (VRU) includes receiving a received signal strength indication (RSSI) level of a wireless signal of a mobile device carried by the VRU detected by a wireless sensor in an area of interest. The detected RSSI level is compared to RSSI fingerprints stored in a fingerprinting database (DB) so as to identify an RSSI fingerprint having a closest match to the detected RSSI level. The VRU is localized at a position stored in the fingerprinting DB for the identified RSSI fingerprint.

20 Claims, 7 Drawing Sheets

(51) Int. Cl.
  *G05D 1/02*  (2020.01)
  *B60W 30/09*  (2012.01)
(52) U.S. Cl.
  CPC ..... *B60W 2510/20* (2013.01); *B60W 2554/00* (2020.02); *B60W 2556/50* (2020.02)

(56) References Cited

U.S. PATENT DOCUMENTS

| | | | | |
|---|---|---|---|---|
| 9,551,779 | B2* | 1/2017 | Glazer | H04N 5/23296 |
| 9,612,123 | B1* | 4/2017 | Levinson | G01S 17/87 |
| 9,701,239 | B2* | 7/2017 | Kentley | G05D 1/0088 |
| 10,412,701 | B2* | 9/2019 | Wu | H04N 5/232 |
| 10,484,832 | B1* | 11/2019 | Tyagi | H04W 24/08 |
| 2006/0089153 | A1* | 4/2006 | Sheynblat | H04W 64/00 455/456.1 |
| 2008/0027599 | A1* | 1/2008 | Logan | G05D 1/0261 701/23 |
| 2011/0117924 | A1* | 5/2011 | Brunner | H04W 4/027 455/456.1 |
| 2012/0046044 | A1* | 2/2012 | Jamtgaard | H04N 7/181 455/456.1 |
| 2013/0157683 | A1* | 6/2013 | Lymberopoulos | H04W 64/00 455/456.1 |
| 2013/0285855 | A1* | 10/2013 | Dupray | G01S 19/48 342/451 |
| 2013/0288704 | A1* | 10/2013 | Wirola | G01S 5/14 455/456.1 |
| 2014/0094187 | A1* | 4/2014 | LaMarca | G01S 5/0252 455/456.1 |
| 2014/0108020 | A1* | 4/2014 | Sharma | G10L 25/87 704/500 |
| 2015/0149085 | A1* | 5/2015 | Bakshi | G01S 5/02 701/500 |
| 2015/0228195 | A1* | 8/2015 | Beaurepaire | B60Q 1/50 340/907 |
| 2015/0247912 | A1* | 9/2015 | Tang | G01S 5/0263 348/169 |
| 2015/0260543 | A1* | 9/2015 | Rantalankila | G01C 25/00 702/94 |
| 2016/0094951 | A1* | 3/2016 | Yang | H04W 4/029 455/456.1 |
| 2016/0094954 | A1* | 3/2016 | Millman | H04W 64/006 455/456.2 |
| 2016/0146618 | A1* | 5/2016 | Caveney | B60W 50/14 701/25 |
| 2016/0286519 | A1* | 9/2016 | Tzur | G01S 5/06 |
| 2018/0082588 | A1* | 3/2018 | Hoffman, Jr. | G08G 1/166 |
| 2019/0045327 | A1* | 2/2019 | Murata | H04W 4/027 |
| 2019/0073883 | A1* | 3/2019 | Hoang | G08B 25/08 |
| 2020/0004241 | A1* | 1/2020 | Levinson | G08G 1/202 |

OTHER PUBLICATIONS

Edwin Olson, "AprilTag: A robust and flexible visual fiducial system", Proceedings—IEEE International Conference on Robotics and Automation, Jun. 2011, pp. 1-8.

Henri Nurminen, et al., "A Survey on Wireless Transmitter Localization Using Signla Strength Measurements", Hindawi Wireless Communications and Mobile Computing, vol. 2017, Dec. 2017, pp. 1-12.

Eladio Martin, et al., "Precise Indoor Localization Using smart Phones", MM '10 Proceedings of the 18th ACM International Conference on Multimedia, Oct. 25-29, 2010, pp. 787-790.

Jonathan Fürst, et al., "Automated Wireless Localization Data Acquisition and Calibration with 6DOF Image Localization", UbiComp '18 Proceedings of the 2018 ACM International Joint Conference and 2018 International Symposium on Pervasive and Ubiquitous Computing and Wearable Computers, Oct. 8-12, 2018, pp. 1372-1381.

Matijn C. Liem, et al., "Joint multi-person detection and tracking from overlapping cameras", Computer Vision and Image Understanding vol. 128, Dec. 2014, pp. 36-50.

* cited by examiner

CALIBRATION FOR WIRELESS LOCALIZATION AND DETECTION OF VULNERABLE ROAD USERS

CROSS-REFERENCE TO PRIOR APPLICATION

Priority is claimed to U.S. Provisional Application No. 62/774,358, filed on Dec. 3, 2018, the entire disclosure of which is hereby incorporated by reference herein.

FIELD

The present invention relates to methods and systems for calibration for wireless localization and detection of vulnerable road users (VRUs), and has particular application for traffic safety and the transportation and automotive industries.

BACKGROUND

Pedestrian localization has been a challenge for traffic safety. For example, autonomous vehicles currently use various technologies including different types of cameras (e.g., stereoscopic cameras) as well as other sensors (e.g., radar and lidar sensors) in order to detect the location of pedestrians. However, these approaches using the sensors of the vehicle have a number of limitations. Some of these limitations arise due to the limited view from the vehicle's perspective. For example, using a camera/lidar, an autonomous car may not find a pedestrian who is located at a blind spot (e.g., behind a wall). Moreover, the camera/lidar-only approach requires certain visibility conditions to operate effectively and does not function properly when the visibility is limited due to darkness, heavy rain, fog, etc.

Global positioning system (GPS) technology can also be used for positioning pedestrians outdoors. However, the accuracy of GPS is also limited (around 8 meters) such that a pedestrian near a road can be considered on the road or on the other side of the road. Moreover, the GPS data collected from the pedestrians through mobile applications are not directly available for the vehicles.

Wireless signal-based localization is limited due to the accuracy of distance estimations using WiFi or Bluetooth devices. More accurate localization approaches require received signal strength indication (RSSI) fingerprinting which may provide about 1.5 meters accuracy (see Martin, Eladio, et al., "Precise indoor localization using smart phones," Proceedings of the 18th ACM international conference on Multimedia, ACM (2010), which is hereby incorporated by reference herein in its entirety). On the other hand, RSSI fingerprinting for wireless systems requires a significant data collection effort in the sense that the location provided for each measurement should be fixed so that the RSSI localization can be calibrated through measurements. Moreover, each indoor or outdoor area may require a map in order to make the calibration possible.

Wireless based localization is also discussed in Vo, Quoc Duy, et al., "A survey of fingerprint-based outdoor localization," IEEE Communications Surveys & Tutorials 18.1, pp. 491-506 (2016); and Nurminen, Henri, et al., "A survey on wireless transmitter localization using signal strength measurements," Wireless Communications and Mobile Computing (2017) each of which is hereby incorporated by reference herein in their entirety.

SUMMARY

In an embodiment, the present invention provides a method for localization of a vulnerable road user (VRU). The method includes receiving a received signal strength indication (RSSI) level of a wireless signal of a mobile device carried by the VRU detected by a wireless sensor in an area of interest. The detected RSSI level is compared to RSSI fingerprints stored in a fingerprinting database (DB) so as to identify an RSSI fingerprint having a closest match to the detected RSSI level. The VRU is localized at a position stored in the fingerprinting DB for the identified RSSI fingerprint.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized that accurate signal-based localization in areas such as roads which cover many regions or areas of interests, as well as scaling the calibration, present open challenges.

Embodiments of the invention provide for calibration of wireless localization based on visual and wireless signal fingerprinting for smart traffic applications through a new crowd-sourcing method or data collection campaigns. The calibration can be applicable to target locations such as road intersections, pedestrian ways or crossroads.

According to an embodiment, the calibration is used for a new approach for localization of VRUs near areas of interests such as road intersections or pedestrian ways. According to another embodiment, a localization system enables this new approach.

In an embodiment, the present invention provides a method for localization of a vulnerable road user (VRU). The method includes receiving a received signal strength indication (RSSI) level of a wireless signal of a mobile device carried by the VRU detected by a wireless sensor in an area of interest. The detected RSSI level is compared to RSSI fingerprints stored in a fingerprinting database (DB) so as to identify an RSSI fingerprint having a closest match to the detected RSSI level. The VRU is localized at a position stored in the fingerprinting DB for the identified RSSI fingerprint.

In the same or other embodiment, the method further comprises alerting a vehicle approaching the area of interest of the localized location of the VRU to take a driving action based on the localized position of the VRU.

In the same or other embodiment, the wireless sensor is attached to a vehicle approaching or moving in the area of interest, the vehicle includes a processing server having access to the fingerprinting DB and being configured to perform the step of comparing the detected RSSI level to the RSSI fingerprints stored in the fingerprinting database DB, and the vehicle includes a VRU alert system to which the localized position of the VRU is transmitted.

In the same or other embodiment, the VRU alert system is configured to alert a driver of the vehicle of the vehicle to the position of the VRU.

In the same or other embodiment, the vehicle is an autonomous vehicle operable to use the localized position of the VRU from the VRU alert system to take a driving action including at least one of slowing down or changing path.

In the same or other embodiment, the method further comprises building the fingerprinting database by:

labelling an object at or near the area of interest, wherein the object is a person or a robot carrying one or more mobile devices;

tracking the object as it moves in the area of interest using one or more cameras;

detecting RSSI levels of the one or more mobile devices as the object moves in the area of interest;

estimating, for each time one of the RSSI levels is detected, a location of the object based on the tracking of the object; and saving the detected RSSI levels together with the corresponding estimated locations as the RSSI fingerprints in the fingerprinting DB.

In the same or other embodiment, the RSSI levels of the object and of the VRU are each detected by one or more static wireless sensors disposed in the area of interest.

In the same or other embodiment, the RSSI levels of the object are detected using a mobile wireless sensor moved to a plurality of points of interest, and the wireless sensor which detects the RSSI level of the VRU is positioned at one of the points of interest at the time of detection.

In the same or other embodiment, the object is labelled for the step of tracking by at least one of: a tag detectable by the one or more cameras, sensors of the one or more mobile devices, clothing or a face.

In the same or other embodiment, the object is a crowd-sourcing participant having a crowd-sourcing application downloaded on the one or more mobile devices by which the crowd-sourcing participant is navigable to a synchronization point, or by which the clothing or the face of the crowd-sourcing participant is available to the one or more cameras for the step of tracking.

In the same or other embodiment, the method further comprises storing the localized position of the VRU together with a timestamp in a database accessible by a traffic control entity.

In another embodiment, the present invention provides a server for localization of a vulnerable road user (VRU), the server having access to a fingerprinting database (DB) and comprising one or more processors which, alone or in combination, provide for execution of a method comprising:

receiving a received signal strength indication (RSSI) level of a wireless signal of a mobile device carried by the VRU detected by a wireless sensor in an area of interest;

comparing the detected RSSI level to RSSI fingerprints stored in the fingerprinting database (DB) so as to identify an RSSI fingerprint having a closest match to the detected RSSI level; and localizing the VRU at a position stored in the fingerprinting DB for the identified RSSI fingerprint.

In the same or other embodiment, the server is disposed in a vehicle and is further configured to transmit the localized position to a VRU alert system for alerting a driver of the vehicle to the localized position of the VRU.

In the same or other embodiment, the server is disposed in an autonomous vehicle operable to use the localized position of the VRU to take a driving action including at least one of slowing down or changing path.

In a further embodiment, the present invention provides a tangible, non-transitory computer-readable medium having instructions thereon, which upon execution by one or more processors, alone or in combination, provide for execution of a method comprising:

receiving a received signal strength indication (RSSI) level of a wireless signal of a mobile device carried by the VRU detected by a wireless sensor in an area of interest;

comparing the detected RSSI level to RSSI fingerprints stored in the fingerprinting database (DB) so as to identify an RSSI fingerprint having a closest match to the detected RSSI level; and localizing the VRU at a position stored in the fingerprinting DB for the identified RSSI fingerprint.

Figure 1:
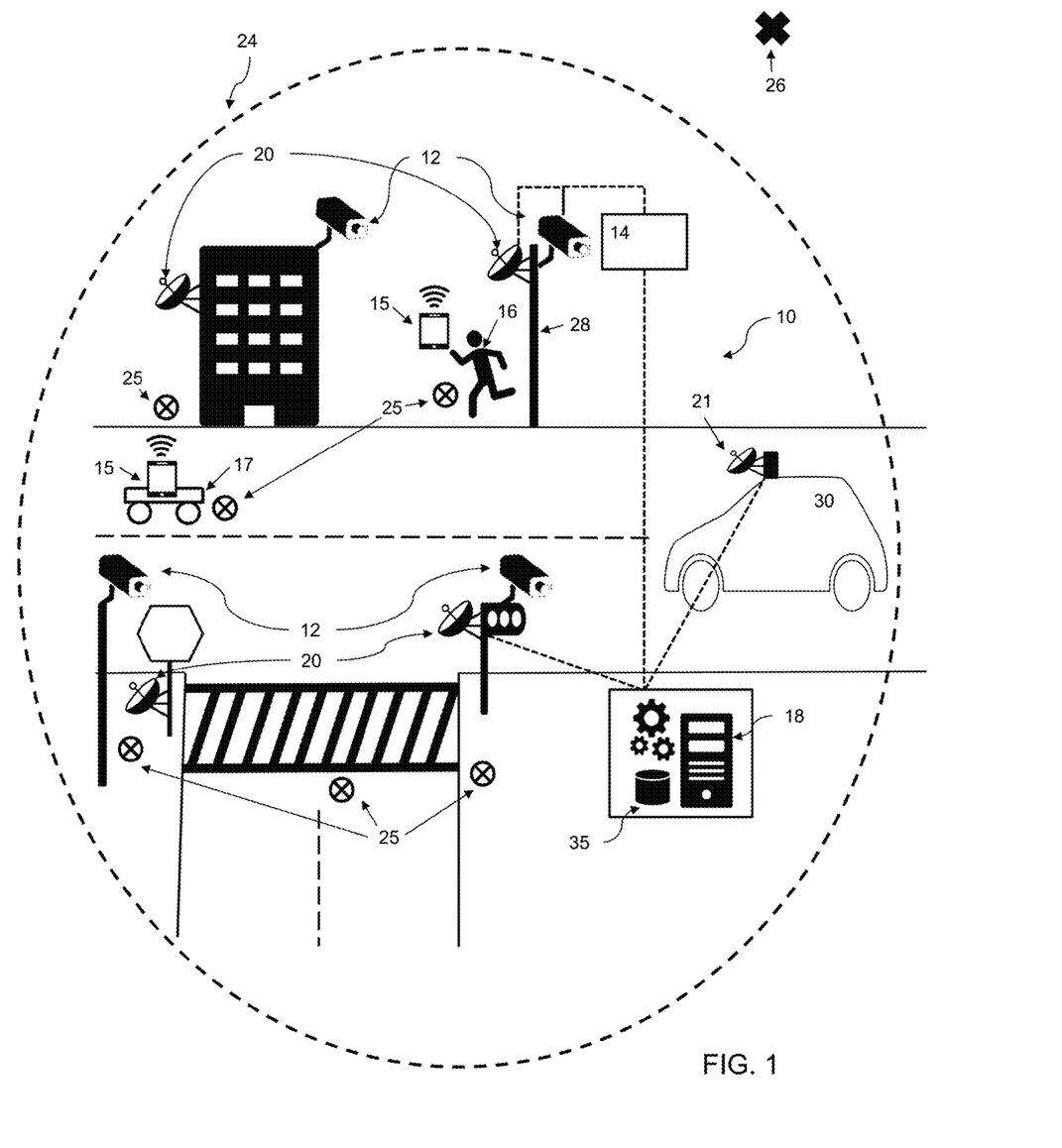
FIG. 1 is schematic overview of a calibration system and method for building a fingerprinting database (DB) according to an embodiment of the present invention.

According to an embodiment, a calibration method is based on the usage of a calibration system 10 shown in an exemplary embodiment in FIG. 1 which includes one or more video cameras 12, a computer vision-based module 14 to track the location of a specified object, one or more wireless-enabled mobile devices 15 carried by one or more persons 16 and/or robots 17, and a server 18 with access to a fingerprinting DB 35 for storage, as well as static wireless sensors 20 and/or dynamic or mobile wireless signal sensors 21 with receiver antennas 22.

FIG. 1 shows an area of an intersection schematically as an area of interest 24, but it is to be understood that other larger or different areas can be used for the calibration and localization according to embodiments of the present invention.

The localization according to an embodiment of the present invention consists of two phases: 1) a calibration (pre-processing) phase and 2) an operation phase. According to an embodiment of the present invention, the method provides for the calibration based on fingerprinting of wireless signals through crowd-sourcing, for example using a crowd-sourcing app on the mobile devices 15, or automated data collection using robots 17 or dedicated personnel as the persons 16, and using one or more cameras 20.

The calibration phase collects the fingerprinting DB for the area of interest 24. According to an embodiment, the calibration starts with placing two cameras 20 (e.g., with tripods) and at least one wireless sensor/receiver 20, 21 (e.g., Wi-Fi or Bluetooth) nearby the area of interest 24 (e.g., a road intersection). In general, for higher accuracy, multiple wireless sensors 20, 21 could be placed, including a combination of both static wireless sensors 20 and mobile wireless sensors 21 according to an embodiment. A mobile wireless sensor 21 can be part of a vehicle 30 having a mobile wireless receiver 21 moving in the area of interest 24 (e.g., the roads which are heading towards the intersection).

The view of the cameras 12 covers the area of interest 24 and the range of the wireless sensors 20, 21 covers the area of interest. Then, a person 16 is placed at one of the points of interest 25 with a selected smartphone as the mobile device 15 which has a unique identifier (e.g., media access control (MAC) address and device model). The data collection from the cameras 12 and wireless sensors 20, 21 can then begin. The inputs from the cameras 12 into the computer vision-based module 14 are used in a vision-based localization algorithm running on the computer vision-based module 14 for accurate vision-based localization. For example, Liem, M., et al., "Joint multi-person detection and tracking from overlapping cameras," Computer Vision and Image Understanding 128, pp. 36-50 (2014), which is hereby incorporated herein in its entirety, describes one way to localize people using vision of multiple cameras. At the same time, RSSI levels are detected from the mobile device 15 by the static wireless sensor(s) 20 as well as the mobile sensor(s) 21 and are saved to the fingerprinting DB 35 as the fingerprint for the device 15 at the point of interest 25.

To make the measurements from the mobile wireless sensor 21 accurate, the vehicle 30 can be moved to a number n of different predefined points 25 and each predefined point location is saved to the database. Therefore, the mobile sensors 21 can be placed at the predefined points 25 one by one and each time wireless fingerprints can be saved along with the location of the mobile sensor 21. According to some embodiments, it is not necessary to use both static wireless sensors 20 and mobile wireless sensors 21, and therefore some of the steps can be skipped accordingly. For instance, if there is no static wireless sensor 20, the calibration phase only includes usage of mobile wireless sensors 21 and sensor placement is not necessary. The calibration is preferably done when the conditions such as light are available for accurate video-based analytics. This procedure can be iterated for different areas of interest and different device models.

The person 16 participates, according to an embodiment, through downloading an app to their mobile device 15 which enables data collection from the mobile device 15 for the calibration system 10. The collected data includes the model of the device 15 and the location information captured from the pre-deployed cameras 12. In the case of crowded scenarios, this approach may not always be feasible, however in the case of less crowded scenarios, the person 16 detected from the cameras 12 can be matched with the device information. In particular, when there is only one person 16 who uses the app which enables sharing of the device model information, device unique ID (i.e., MAC address) and broadcasts wireless signals (e.g., Bluetooth and Wi-Fi signals), this information can be saved to the fingerprinting database along with wireless signals received by the wireless sensors 20, 21 at the same time and location information that comes from the computer vision-based module 14. The server 18 and the computer vision-based module 14 do not have to be located at the area of interest 24, but can rather be located elsewhere and communicate with the cameras 12 and wireless sensors 20, 21. For example, the server 18 and the computer vision-based module 14 could be part of the same or different computing entity, could be located in the Cloud, or the computer vision-based module 14 could be integrated in the cameras 12 and the server 18 could be located in the vehicle 30. The server 18 communicates with the cameras 12 and sensors 20, 21 and the as indicated by the dashed lines shown in FIG. 1. If the computer vision-based module 14 is not part of the camera 12 or the server 18, it can communicate with each of these components.

The cameras 12 can therefore be used for detection and tracking of the person 16, as well as a robot 17. As already indicated above, considering cases where there are multiple pedestrians or even a crowd exists in the same road intersection, matching the wireless device fingerprints with the tracked person 16 is a complicated task. An embodiment of the present invention handles this task as follows.

For the crowded scenarios, the person 16 is a crowd-sourcing participant wearing specific clothing (e.g., using tags such AprilTags as discussed in Olson, Edwin, "AprilTag: A robust and flexible visual fiducial system," 2011 IEEE International Conference on Robotics and Automation (ICRA), IEEE (2011), which is hereby incorporated by reference herein in its entirety) which can be considered for differentiating the participant who helps crowd-sourcing with the other people and finding the location of this participant more accurately.

Another method to differentiate the participant from other people according to an embodiment is to track the path travelled by the user, such that the calibration system 10 is aware that the participant is approaching to the area of interest 24 (e.g., a road intersection). The tracking of the person can be done through use of mobile phone sensors such as GPS sensors, accelerometers, gyroscopes, and others in order to understand the movement direction of the participant.

The tracking of the participant can start early by other cameras which are distributed in different areas close to the area of interest. During the movement of the participant, when any camera detects only one person or it detects people clearly physically separated from each other and the location estimation of the camera matches the GPS estimation of the smartphone, the participant is labeled and started to be tracked by the calibration system 10 with multiple cameras 12.

Another approach for tracking the crowd-sourcing participant according to an embodiment is synchronization-based. In this approach, the participant is navigated to a synchronization point 26 by the app and a camera 12 is located at the synchronization point 26. When the participant arrives at the synchronization point 26, the participant triggers the detection using the app, so that the camera 12 detects the participant's body with particular clothing, which can be used as a label, and the calibration system 10 starts tracking the participant until and after the participant leaves the area of interest 24, so that the participant can be always tracked and his/her wireless fingerprint is always matched with the correct location given by the vision-based localization using cameras. The synchronization point 26 is preferably in a non-crowded area outside of the area of interest 24. For example, at the beginning of a day, the participant can show their face and clothing at a predefined synchronization point 26 located anywhere and then throughout the day the participant can be located by cameras on that basis in the area of interest 24 or other areas of interest which the participant may enter into. For example, the system can associate the MAC ID of the mobile device 15 with the person 16 so recognized by their face and clothing.

Another approach for tracking the participant according to an embodiment is through face-detection technology. In this approach, the crowd-sourcing participant uploads a photo of himself/herself using the smartphone app or simply takes a face photo using the app on their mobile device 15. The photo is then saved in a face database of the calibration system 10, so that whenever the participant approaches to the calibration area, his/her face is detected by the camera 12 and the participant can be tracked during the camera-based localization and his/her wireless fingerprint can be matched correctly with the location information.

Figure 2:
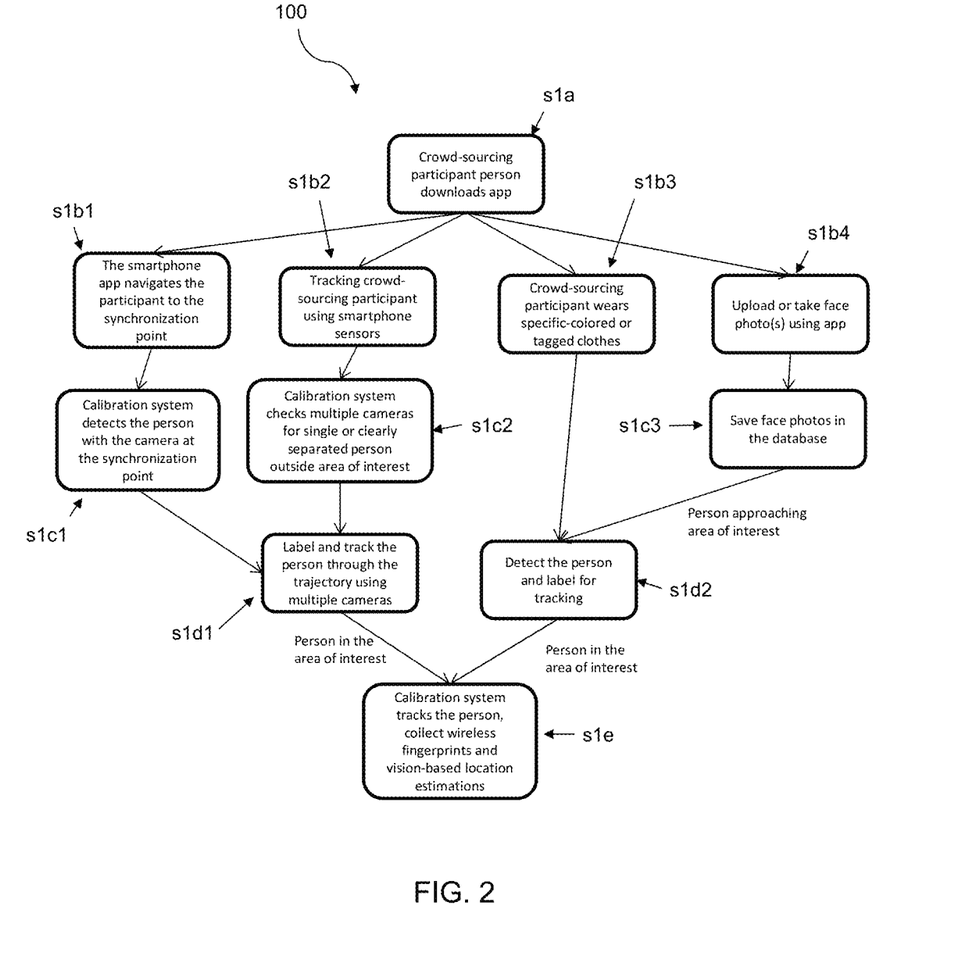
FIG. 2 is a flow chart illustrating possible embodiments of a calibration method using the crowd-sourcing participant.

FIG. 2 illustrates a method 100 according to an embodiment of the present invention using crowd-sourcing for calibration of wireless localization. In a first step s1a, a crowd-sourcing participant downloads the crowd-sourcing app to his/her device (e.g., smartphone). Then, one or more of steps s1b1, s1b2, s1b3 or s1b4 can be performed. In step s1b1, the participant is instructed by their device through the crowd-souring app to proceed to a known synchronization point, and may be directed there (e.g., using the device's GPS). Once the user has reached the synchronization point, this is recognized by the device's GPS and can also be indicated by the participant requesting the app to detect him/her at the synchronization point using a camera placed at or near the synchronization point. The camera detects the participant at the synchronization point in a step s1c1. In so doing, the camera can also detect identifying characteristics of the participant, such as clothing features, shape, etc., which can be used for labeling and tracking by cameras after the participant leaves the synchronization point in step s1d1.

In the step s1b2, one or more location or position sensors of the participant's device can be used for tracking the participant. For example, the GPS of a smartphone can be used to determine whether the participant is approaching an area of interest. Then, in a step s1c2, the cameras at or near the area of interest check whether there is a single or distinct person outside the area of interest that would be the participant based on the information from the device's sensors. As above, the camera(s) can also detect identifying characteristics of the participant which can be used for labeling and tracking by cameras after the participant leaves the synchronization point in step s1d1.

In steps s1b3 and s1b4, identifying information of the participant is already known to the calibration system. For example, in step s1b3, it is known that the participant wears particular and/or tagged clothing. This information can be input into or taken by the participant's device and communicated to the calibration system. Alternatively, participants can wear specially colored, patterned clothing and/or tags. In step s1b4, the participant provides the identifying information by uploading or taking photos of his/her face using their device. The photos are saved in a database in a step s1c3 for reference by the calibration system when performing the camera-based detection and tracking in the areas of interest in step s1d2. Regardless of how the participant is identified, labeled and tracked, the calibration system collects RSSI signal levels of the participant's device while the participant is being tracked by the cameras so as to provide wireless fingerprints and vision-based location estimations in step s1e.

According to another embodiment, a calibration method is provided using a data collection campaign. This embodiment provides for more regular and automated data collection (as opposed to crowdsourcing), where, referring again now to FIG. 1, the person 16 is a dedicated person and/or one or more robots 17 moves for fingerprinting.

A person 16 (or a robot 17) can move carrying one or multiple different mobile devices 15 without waiting for the procedure to collect data offline. The device unique identifiers are already saved in the fingerprinting DB 35 or another database. The offline video captures and the wireless signals (for a certain time period) are collected in a server in the Cloud or Edge which has the offline processing module. Offline processing makes the video-based object localization and saves the received wireless signals having the exact timestamps. The device IDs (corresponding to specific device models) and signals' fingerprints are saved in the fingerprinting DB 35.

The server 18 can be placed in a road side unit (RSU) for Edge computing which can be attached, e.g., to a traffic light or in a Cloud environment. In the Cloud environment, the database may contain offline processing results from multiple areas of interests 24, whereas a RSU (Edge) may contain only the information from the area of interest that it corresponds to.

For effective video-based localization, technologies such as the AprilTags, can be leveraged, such that the person 16 can carry a tag to make the localization more accurate.

To automate the calibration process according to an embodiment, a mobile robot 17 is used which travels through the whole area of interest 24 and the measurements are taken based on localization of the robot 17 instead of a person 16.

The calibration phase can be a continuous or an on-going phase, meaning that even when the localization system is in use (in the operation phase), the fingerprinting DB can be updated or improved with new measurements.

Figure 3:
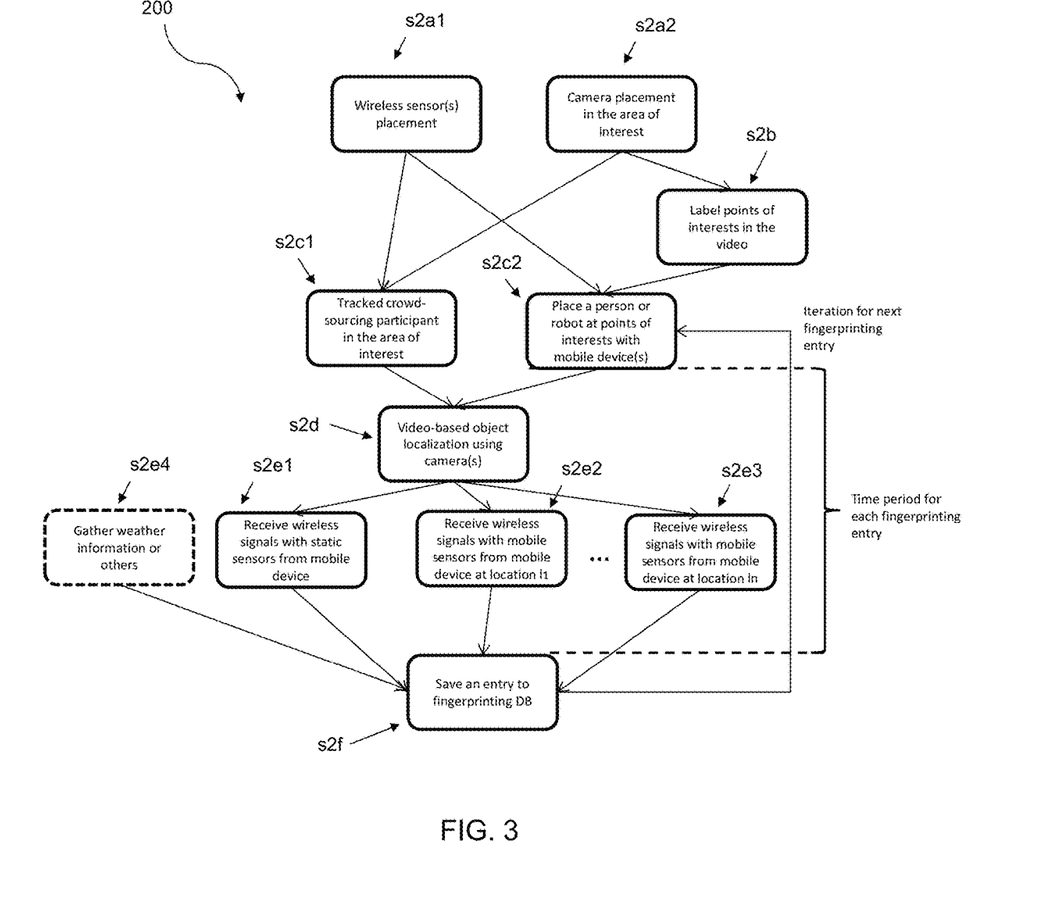
FIG. 3 is another flow chart illustrating an embodiment of a method for building the fingerprinting DB including.

FIG. 3 illustrates a calibration procedure 2 according to an embodiment through iterations of video-based localization and signal fingerprinting. In steps s2a1 and s2a2, one or more wireless sensors and one or more cameras are placed in the area of interest at known locations. In step s2b, points of interest in the video of the camera(s) can be labelled. A tracked crowd-sourcing participant can be detected by the sensor(s) and/or camera(s) in accordance with any of the embodiments discussed herein in the area of interest in step s2c1. Alternatively or additionally, in a step s2c2, a person or robot can be placed at a point of interest, for example, to be detected and labelled, if necessary, and then begin moving around the area of interest from these. The crowd-sourcing participant, person or robot is localized in step s2d using the camera(s) and video-based object localization. For the localized position of the crowd-sourcing participant, person or robot, wireless signals are taken in steps s2e1, s2e2 and s2e3 for providing a fingerprint for the RSSI level at the localized position relative to the sensors. If one or more static sensors are used, these can detect the wireless signals in step s2e1 and, if one or more mobile sensors are used, these can detect the wireless signals in steps s2e2 and s2e3 for a number of locations $l_1$ to $l_n$ (e.g., during movement of a vehicle having a sensor). If other information is to be saved with the fingerprints, such as weather conditions, this can be determined in step s2e4. The wireless signals for the localized position, and any other information, are saved as an entry to the fingerprinting database in step s2f, at which point a next iteration beginning from step s2c1 and/or s2c2 can begin for a next fingerprint entry for a next localized position.

According to a further embodiment, a method provides for calibration by crowd-sourcing and a 3D model of the environment. This embodiment makes use of the system proposed for localization in Fuerst, J., et al., "Automated Wireless Localization Data Acquisition and Calibration with 6DOF Image Localization," Proceedings of the Workshop on Combining Physical and Data-Driven Knowledge in Ubiquitous Computing (2018), which is hereby incorporated herein by reference in its entirety, for localization as an additional alternative for implementing the method according to an embodiment. Instead of deploying a camera, an existing or newly created (e.g., using an off-the-shelf solution) 3D model of environment is used. For regions, such as cities, available 3D models can be used for calibration. In this embodiment, crowd-sourcing participants download a mobile app and take a picture with their smartphones. The location of the person can be inferred based on the taken photo and the localization of that photo in the 3D model.

According to an even further embodiment, a method provides for calibration using device-free localization and one or more cameras. This embodiment uses the camera(s) to calibrate locations of people who do not use any mobile device or who use a mobile device which is wireless-disabled. In this scenario, instead of wireless sensors, wireless transceivers are placed in the environment (or on the vehicle), so that the calibration is performed through saving body reflections of wireless signals and the location data to the fingerprinting DB.

The methods according to embodiments of the present invention provide for creation of the fingerprinting DB for every "area of interest." The areas of interest can be places where traffic accidents can happen such as a traffic intersection with or without traffic lights or a pedestrian passage way.

The created fingerprinting DB, according to an embodiment, includes the following format for each entry:

DB Entry=(<Static_RSSI_set>, <Mobile_RSSI_set>, <Location>, <Device_model>, <Device_version>, <Weather_condition>, <Other_information>)
<Static_RSSI_set>=(<Static_RSSI_1>, <Static_RSSI_2>, . . . <Static_RSSI_n>) contains the fingerprints based on the RSSI values received for the particular measurement. The size of this set (n) is equal to the number of static wireless sensors. Each measurement has the following information:
Static_RSSI=(<Static_sensor_id>, <RSSI_value>, <Sensor_location>, <Other_information>)
where, above, <Sensor_location> and <Other_information> are optional fields. <Sensor_location> is a specific subclass of <Location>, following the same format.
<Mobile_RSSI_set>=(<Mobile_RSSI_1>, <Mobile_RSSI_2>, . . . <Mobile_RSSI_n>)
contains the fingerprints based on the RSSI values received for the particular measurements at n specific locations (e.g., from one or multiple vehicles). Each measurement has the following information:
Mobile_RSSI={<Vehicle_location>, <RSSI_value>, <Other_information>),
where <Other_information> is optional. <Vehicle_location> is a specific subclass of <Location>, following the same format.
<Location>=(<Latitude>, <Longitude>, <Altitude>) defines the coordinate values where <Altitude> is optional field.
<Device_model> and <Device_version> is used to include data from different set of device. These fields are used to cover the differences of wireless antennas of different model and version mobile devices.
<Weather_condition> can be defined in specific classes such as "Clear", "Light Rain", "Fog", "Heavy Rain", "Snow", etc. For the best experience, entries can be created for different weather conditions of the area of interest. <Weather_condition> is an optional field.
<Other_information> is an optional field which may contain other specific information of the environment during the measurement.

Figure 4:
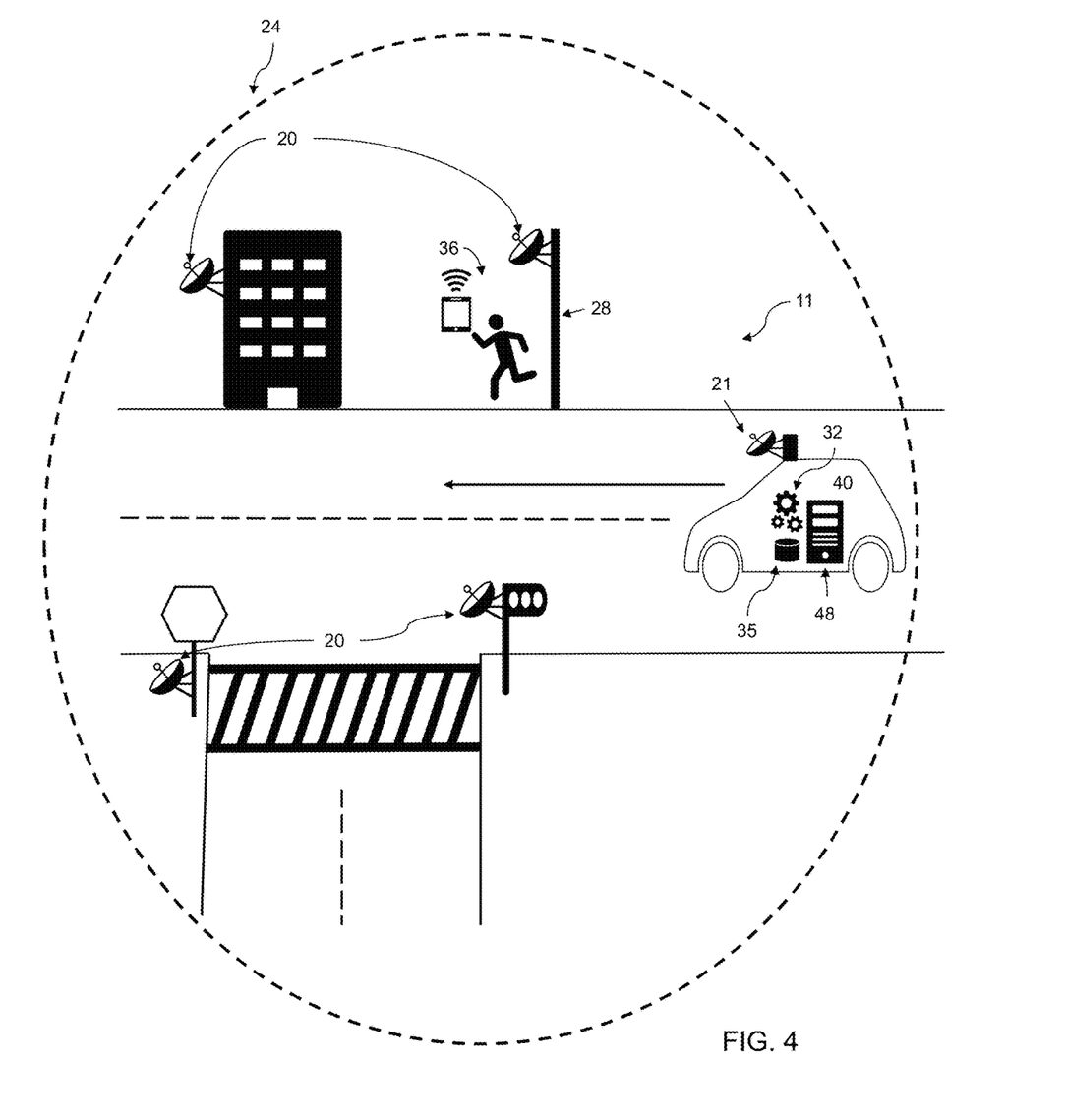
FIG. 4 is a schematic overview of a localization system and method for localizing a VRU using the fingerprinting DB according to an embodiment of the present invention.

Referring to FIG. 4, according to an embodiment, the operation phase is run in a localization system 11, which additionally to the calibration system 10 of FIG. 1 includes a localization estimation module 32 and does not require cameras 12, and uses static wireless sensors 20. After the calibration phase finishes, the operation phase can start. During the operation phase, the cameras 12 can be removed from the area of interest 24, if desired. The operation continues using only the wireless sensors 20, 21 (or transceivers), which sense wireless signals from the area of interest 24 and send them to a processing server 48 where the localization estimation module 32 can be placed. The localization estimation module 32 finds the closest match in the fingerprinting DB 35 by searching for the specific area of interest 24, specific device model of the wireless device 15 of a VRU with a mobile device 36 (which can be captured from the organizationally unique identifier (OUI)), and the signal fingerprints. The pre-computed (video-based) location that is matched with the fingerprint which is closest to the observed fingerprint is returned as the output. The output result can then be shared to the vehicles close to the area of interest through the Internet (for the Cloud case) or through direct/multi-hop wireless communication using communication protocols such as WiFi or V2X (for the Edge case). During the operation phase, mobile wireless sensors 21 can still be used, however there must be at least one static sensor 20 placed near or in the area of interest 24.

According to the example of FIG. 4, the operation phase uses two static wireless sensors 20 that send their detected RSSI values to a vehicle 40 having the localization estimation module 32 for obtaining the VRU location. In this example operation scenario, the VRU 36 is very close to a road, but not visible to the vehicle 40 due to an obstacle 28 (e.g., a wall) in-between. The two static wireless sensors 20 receive RSSI values and send them to the vehicle 40 through wireless communication (through the vehicle's wireless receiver 42). The vehicle 40 combines these signal strengths along with the signal strength it received using its attached wireless sensor 42 and the localization estimation module 32 compares the values to the fingerprinting DB and outputs a localization estimation. The localization of the VRU 36 can be then used by the vehicle 40 for taking driving control decisions, such as slowing down, stopping or evasive steering.

According to another embodiment, the operation phase uses only mobile wireless receiver 42 of the vehicle 40. This embodiment assumes that there exists no static wireless sensor 20. In this case, the calibration phase is based on collecting data using a mobile wireless sensor 21 such as one attached to a vehicle 30 (see FIG. 1). The processing server 48 which accesses the fingerprinting DB 35 can be either in the Cloud or physically located in the vehicle 40 itself, so that when the vehicle 40 senses wireless signals at a location which matches or is close to a location from which the mobile wireless sensor 21 has taken fingerprints in the calibration phase, the localization estimation module 32 outputs the location of the VRU corresponding to the closest match of RSSI values. In the case of physically locating the processing server 48 in the car (Edge), the fingerprinting DB 35 is either pre-installed in the vehicle processing server 48 or is stored in the Cloud and can be periodically updated through Internet services. Where the wireless sensors 21 of vehicles 30, 40 are homogeneous, the location of the vehicle 30 can also be recorded in the fingerprinting DB 35 for each fingerprint entry so that later if the vehicle 40 comes to the same or a close location, the previously recorded fingerprint can be used for localization.

The calibrated localization can be used for standard or autonomous vehicles. Three different embodiments are provided for leveraging the calibrated localization information by the autonomous or non-autonomous vehicles:
1) Only static sensor(s): According to a first embodiment, data from static wireless sensors 20 are gathered in the server 48, compared against the fingerprinting DB 35, and shared with the vehicle 40 or a different approaching vehicle. The server 48 and the fingerprinting DB 35 can reside either on the vehicle 40 or in a RSU close by. Using multiple sensors, a mobile device 15 at a location A (e.g., found using multiple cameras) can give the following exemplary values for three different sensors: −77 dBm for sensor 1, −36 dBm for sensor 2 and −50 dBm for sensor 3. Each of these values can be saved as the fingerprint for the location A such that when the sensors later record similar values, the estimate can be given as location A.

2) Only mobile sensor(s): According to a second embodiment, only a mobile wireless sensor 21 is placed on the vehicle and no static wireless sensors 20 are used. In this embodiment, the vehicle 40 receives signals directly from the VRU 36 and based on the fingerprinting DB 35 the vehicle estimates the location of the VRU 36. The server 48 and the fingerprinting DB 35 can reside either on the vehicle 40 or in a RSU close by. For this embodiment, the calibration phase preferably includes placing the vehicle 30 at many or all locations in the area of interest 24, at least in areas within the road boundaries, and collecting fingerprints at each of those locations, while the person 16 or the robot 17 is also located in many or all locations of the area of interest 24.

3) Combination of static and mobile sensors: According to a third embodiment, signals are received from both pre-deployed static wireless sensors 20 as well as the mobile wireless sensor 21 of the vehicle 40. In this case, all of these signals are gathered in the server 48 and compared against the fingerprinting DB 35 as the location estimation. The fingerprints for each location can therefore include entries from multiple sensors as discussed above. Additionally, for the mobile sensors, the location of the mobile sensor for each value can also be saved in the fingerprinting DB 35 and used in the location estimation. The server 48 and the fingerprinting DB 35 can reside either on the vehicle 40 or in a RSU close by.

In each of the embodiments, the localization information of the VRU can be used by the vehicle 40 to take driving actions, and can also be shared with other nearby or approaching vehicles, for example, via vehicle-to-vehicle communications. This localization information can also be combined with information coming from other sensors or can be used standalone for the vehicle 40. Based on this information, an autonomous vehicle or the driver of a non-autonomous vehicle can make decisions such as braking, slowing down, or driving at the same speed.

Embodiments of the present invention provide for the following improvements and advantages:

1) A wireless localization calibration method using static and/or mobile wireless sensors and one or more video cameras through crowd-sourcing or data collection campaigns.
2) A crowd-sourcing method for matching wireless fingerprints to the participants tracked and localized by the one or more video cameras.
3) More accurate and reliable localization through the calibration methods, compared to GPS or existing wireless localization approaches.
4) Faster localization compared to existing camera- or image-based approaches, at reduced computational cost, and at reduced costs and constraints for associated hardware. This is an especially important improvement in the field of traffic safety, and particularly in the context of autonomous driving, in which even relatively small delays in detection caused by required computational effort can result in an accident either being avoided or not.
5) Ability to localize VRUs who are not in the view of the vehicle, which is not possible with existing camera- or image-based approaches.
6) More reliable operation in all weather and lighting conditions, and all different environments) compared to existing camera- or image-based approaches. In particular, the existing approaches and technologies (such as using video cameras) are unable to adequately detect VRUs in cases of darkness (e.g., streets without much lighting), obstacles that block the view of the camera or distance sensors, areas where usage of camera is not allowed due to privacy constraints. Moreover, these solutions require, in addition to expensive equipment such as the cameras, a high amount of computational processing power, as well as specialized hardware such as Graphics Processing Units (GPUs) relative to embodiments of the present invention.

According to an embodiment, the method comprises:
placement of sensors and cameras;
labelling a crowd-sourcing participant or dedicated person/robot for video tracking; and
fingerprinting wireless data, location estimations and other information.

Incentives could be provided to encourage the crowd-sourcing and gain active participation of users. As discussed above, embodiments of the present invention can be especially useful for the automotive industry, in particular for driver or vehicle decision taking. While it is noted that manual marking of locations can be done, the vision-based localization provides a number of advantages as indicated above.

Figure 5:
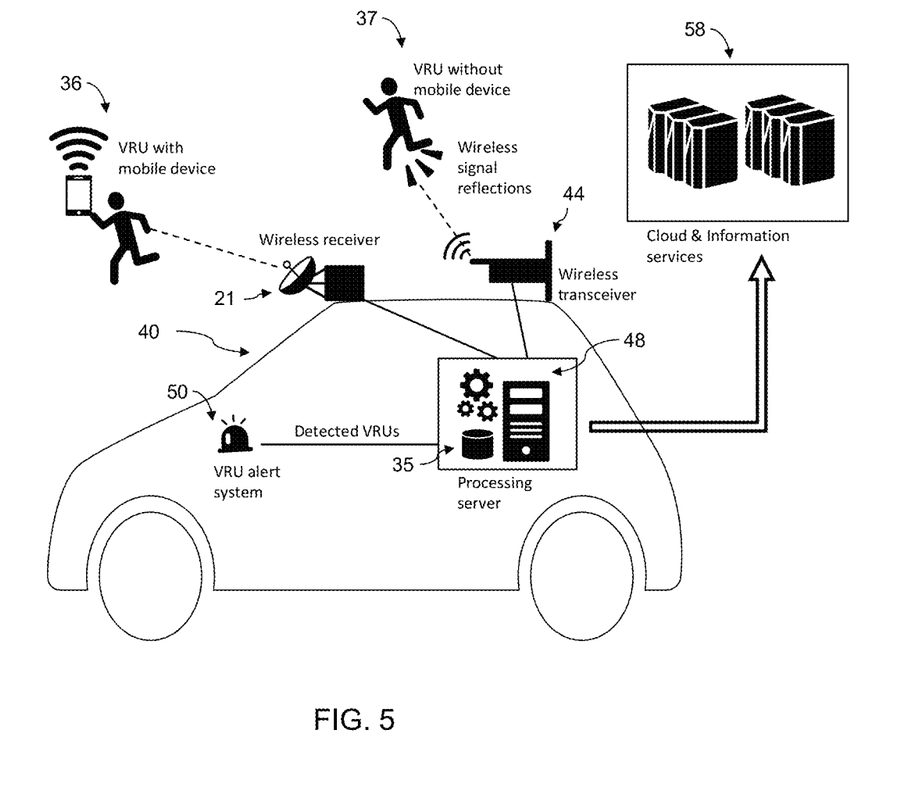
FIG. 5 is a schematic overview of an embodiment of the localization system with a mobile wireless sensor and an alert system.

FIG. 5 schematically shows the vehicle 40 with the processing server 48 and a VRU alert system 50. The vehicle can include a wireless transceiver 44 in addition to the mobile wireless sensor 21. The wireless transceiver 44 can be used to determine the location of a VRU without a mobile device 37 through signal reflections. The VRU alert system 50, for example, including a display, warning light and/or alarm, and/or consisting of a controller for directing corrective actions of the vehicle 40, is notified by the processing server 48 if one or more VRUs 36, 37 are detected. The alert system 50 then alerts the driver of the vehicle 40 about the VRUs 36, 37 and their locations using the display, warning light or the alarm, and/or uses the controller to cause the vehicle 40 to take automated evasive driving actions to avoid the VRUs 36, 37, slow down or stop. The vehicle 40 can also communicate with other vehicles regarding the position of the VRUs 36, 37 and/or store them in a Cloud server 58 where they can be accessed by other vehicles and/or used for learning purposes. Further, the vehicle alert system 50 can also alert other safety procedures used by the vehicle 40. For example, if the vehicle has a camera-based monitoring system, the camera can be directed to the location of the VRUs 36, 37.

The historical data in the Cloud server 58 can be used by information services to share the data with various other applications and to provide a user interface and visualization. The data could be used by traffic operators or with other vehicles, e.g., so they may choose to travel a particular route with fewer VRUs 36, 37 or can avoid potential conflicts with localized VRUs 36, 37.

Preferably, the processing server 48 resides within the vehicle 40 for faster processing, quicker issuance and reception of control actions and avoidance of delay or communication malfunction. However, in different embodiments, the processing server 48 does not have to reside in the vehicle 48. The processing server 48 could also be physically located in one or more RSUs or in the Cloud. In some embodiments, the server 18 used in the calibration phase can be used as the processing server 48 during the operation phase.

Moreover, behaviors of the VRU 36 can be determined by repeating the localizations over a measurement period, for example to determine a path of the VRU 36 relative to a path of the vehicle 40 in order to further facilitate the driving actions and determine, for example, whether the VRU 36 is headed to a more dangerous or safer location. This allows for more accurate decision making by predicting where the VRU 36 will be relative to the approaching vehicle 40. It can also enable a determination of whether the behavior is expected, and therefore safe.

Figure 6:
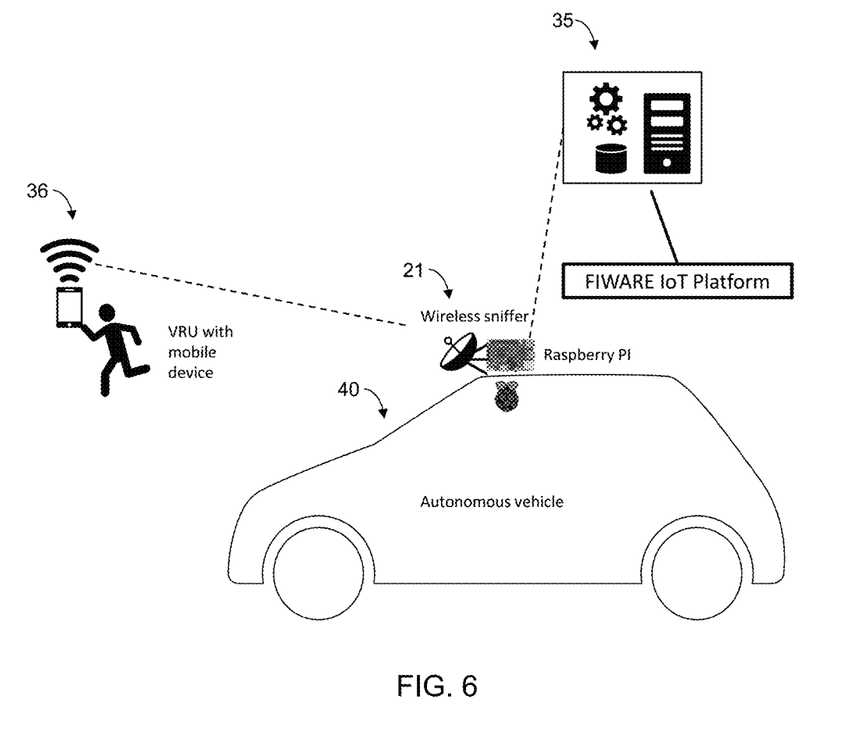
FIG. 6 is a schematic overview of an autonomous vehicle useable in the localization system with a mobile device using Raspberry Pi for the wireless mobile sensor attached to the vehicle.

FIG. 6 shows the vehicle 40 with a mobile wireless sensor 21 using Raspberry Pi and a FIWARE IoT Platform. Raspberry Pi is an off-the-shelf device which could be advantageously used due its small size and relatively low cost for the mobile wireless receiver. The fingerprinting DB 35 and analytics server for comparing received values for the location estimation in this embodiment is located outside the vehicle 40, for example, in the Cloud. The FIWARE IoT platform can be located in the Cloud for information exchange, and could be used to serve historical data or to also store fingerprinting data.

Figure 7:
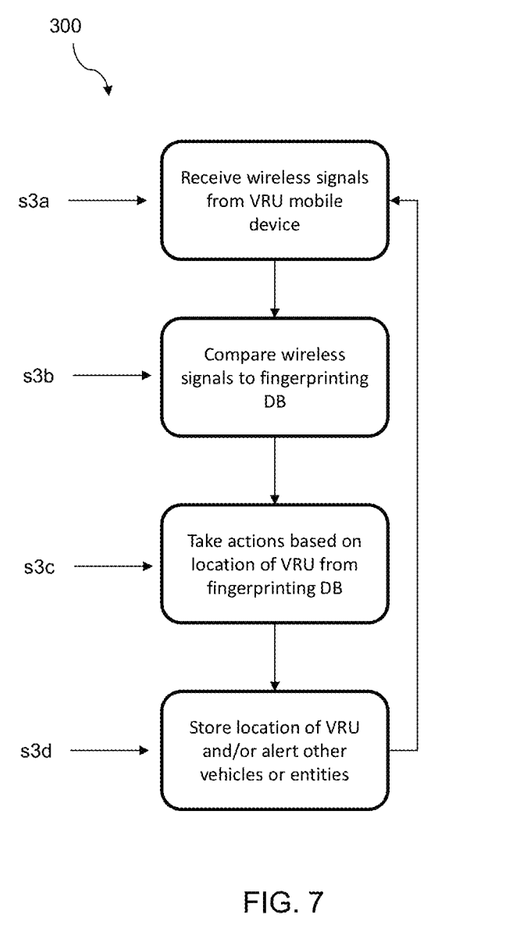
FIG. 7 is a flow chart illustrating a method for detection and localization of a VRU using the fingerprinting DB.

FIG. 7 is a flow chart of a method 300 for localization according to an embodiment in an operation phase which uses the fingerprinting DB created in the calibration phase. In a step s3a, wireless signals are received at the processing server from a VRU with a mobile device via one or more static wireless sensors and/or a mobile wireless sensor attached to the vehicle. This is preferably done by the wireless sensors sniffing out wireless signals (e.g., Wi-Fi probes of mobile devices, Wi-Fi packets, Bluetooth low energy beacons and/or Bluetooth signals) in the area. The VRU could also use an application on their mobile device for sending the signal strength to the wireless sensors. In a step s3b, the detected RSSI values are compared to the RSSI values in the fingerprinting DB. In an embodiment using the static wireless sensor(s), the detected RSSI value(s) from the VRU are compared to RSSI value(s) in the fingerprinting DB for the same static wireless sensor(s), or mobile wireless sensor(s) at or near the same position in the calibration phase as in the operation phase. In an embodiment using the mobile wireless sensor attached to the vehicle, the detected RSSI value from the VRU is compared to the fingerprinting DB for measurements taken in the calibration phase from a static wireless sensor or a mobile wireless sensor at a point of interest that is the same as or near to the position of the vehicle when the mobile wireless sensor attached thereto receives the wireless signal from the VRU. Once a closest match has been located in the fingerprinting DB, the corresponding location for that RSSI value stored in the fingerprinting DB is sent to the vehicle (in the case the processing server is not already located in the vehicle) and used by the vehicle in a step s3c for alerting the driver and/or taking automated driving actions. Also, as discussed above, it is possible to determine a behavior of the VRU through repeated localizations (iterations of steps s3a and s3b) such that, for example, a future location of the VRU can be predicted relative to the path of the vehicle (e.g., as determined by GPS and speed) likewise for alerting the driver and/or taking automated control actions, and/or alerting the VRU. It is also possible to receive multiple wireless signals in step s3a and to differentiate multiple VRUs (e.g., by device type) and to localize the VRU's in parallel. It is moreover possible in step s3a to receive multiple wireless signals from a same VRU mobile device over a measurement period (e.g., using the attached mobile wireless sensor during movement of the vehicle). In this case, the fingerprinting DB can be used in step s3b to determine a closest match of RSSI values at each of the locations or the RSSI values could be averaged for an intermediate estimated location between the measurements. In a step s3d, the localized position(s) of the VRU(s) is stored in the Cloud with a timestamp and/or sent to a traffic control entity or other vehicles approaching or in the vicinity of the area of interest.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for localization of a vulnerable road user (VRU), the method comprising:
calibrating for wireless localization by:
labelling an object at or near an area of interest, wherein the object is a person or a robot carrying one or more mobile devices;
tracking the object as it moves in the area of interest using one or more cameras;
detecting received signal strength indication (RSSI) levels of the one or more mobile devices as the object moves in the area of interest;
estimating, for each time one of the RSSI levels is detected, a location of the object based on the tracking of the object; and
saving the detected RSSI levels together with the corresponding estimated locations as RSSI fingerprints in a fingerprinting database (DB);
detecting an RSSI level of a wireless signal of a mobile device carried by the VRU detected by a wireless sensor in the area of interest;
comparing the detected RSSI level of the wireless signal of the mobile device carried by the VRU to the RSSI fingerprints stored in a fingerprinting database (DB) so as to identify one of the RSSI fingerprints having a closest match to the detected RSSI level of the wireless signal of the mobile device carried by the VRU; and localizing the VRU at a position stored in the fingerprinting DB for the identified RSSI fingerprint.

2. The method according to claim 1, further comprising alerting a vehicle approaching the area of interest of the localized location of the VRU to take a driving action based on the localized position of the VRU.

3. The method according to claim 1, wherein the wireless sensor is attached to a vehicle approaching or moving in the area of interest, wherein the vehicle includes a processing server having access to the fingerprinting DB and being configured to perform the step of comparing the detected RSSI level of the wireless signal of the mobile device carried by the VRU to the RSSI fingerprints stored in the fingerprinting database DB, and wherein the vehicle includes a VRU alert system to which the localized position of the VRU is transmitted.

4. The method according to claim 3, wherein the VRU alert system is configured to alert a driver of the vehicle to the position of the VRU.

5. The method according to claim 3, wherein the vehicle is an autonomous vehicle operable to use the localized position of the VRU from the VRU alert system to take a driving action including at least one of slowing down or changing path.

6. The method according to claim 1, wherein the RSSI levels of the object and of the VRU are each detected by one or more static wireless sensors disposed in the area of interest.

7. The method according to claim 1, wherein the RSSI levels of the object are detected using a mobile wireless sensor moved to a plurality of points of interest, and wherein the wireless sensor which detects the RSSI level of the VRU is positioned at one of the points of interest at the time of detection.

8. The method according to claim 1, wherein the object is labelled for the step of tracking by at least one of: a tag detectable by the one or more cameras, sensors of the one or more mobile devices, clothing or a face.

9. The method according to claim 8, wherein the object is a crowd-sourcing participant having a crowd-sourcing application downloaded on the one or more mobile devices by which the crowd-sourcing participant is navigable to a synchronization point, or by which the clothing or the face of the crowd-sourcing participant is made available to the one or more cameras for the step of tracking.

10. The method according to claim 1, further comprising storing the localized position of the VRU together with a timestamp in a database accessible by a traffic control entity.

11. A method of calibrating for wireless localization and building a fingerprinting database (DB), the method comprising:

labelling an object at or near the area of interest, wherein the object is a person or a robot carrying one or more mobile devices;

tracking the object as it moves in the area of interest using one or more cameras;

detecting received signal strength indication (RSSI) levels of the one or more mobile devices as the object moves in the area of interest;

estimating, for each time one of the RSSI levels is detected, a location of the object based on the tracking of the object; and saving the detected RSSI levels together with the corresponding estimated locations as RSSI fingerprints in the fingerprinting DB.

12. The method according to claim 11, wherein the RSSI levels of the object are detected by one or more static wireless sensors disposed in the area of interest.

13. The method according to claim 11, wherein the RSSI levels of the object are detected using a mobile wireless sensor moved to a plurality of points of interest.

14. The method according to claim 11, wherein the object is labelled for the step of tracking by at least one of: a tag detectable by the one or more cameras, sensors of the one or more mobile devices, clothing or a face.

15. The method according to claim 14, wherein the object is a crowd-sourcing participant having a crowd-sourcing application downloaded on the one or more mobile devices by which the crowd-sourcing participant is navigable to a synchronization point, or by which the clothing or the face of the crowd-sourcing participant is made available to the one or more cameras for the step of tracking.

16. The method according to claim 15, wherein the tracking begins based on recognizing the crowd-sourcing participant at the synchronization point indicated by the crowd-sourcing application.

17. A calibration system for wireless localization, the system comprising:

one or more cameras disposed in an area of interest and configured to track an object as it moves in an area of interest using a label applied to the object, wherein the object is a person or a robot carrying one or more mobile devices;

at least one wireless sensor disposed in the area of interest and configured to detect received signal strength indication (RSSI) of the one or more mobile devices;

a computer vision-based module configured to estimate, for each time one of the RSSI levels is detected, a location of the object based on the tracking of the object; and a fingerprinting database (DB) storing the detected RSSI levels together with the corresponding estimated locations as RSSI fingerprints.

18. The system according to claim 17, wherein the at least one wireless sensor includes a combination of at least one static wireless sensor and at least one mobile wireless sensor, the at least one mobile wireless sensor being configured to be moved about the area of interest.

19. The system according to claim 17, wherein the object is labelled for the step of tracking by at least one of: a tag detectable by the one or more cameras, sensors of the one or more mobile devices, clothing or a face.

20. The system according to claim 17, wherein the object is a crowd-sourcing participant having a crowd-sourcing application downloaded on the one or more mobile devices by which the crowd-sourcing participant is navigable to a synchronization point, or by which the clothing or the face of the crowd-sourcing participant is made available to the one or more cameras for the step of tracking.

* * * * *